United States Patent
Polastri et al.

(10) Patent No.: US 7,985,790 B2
(45) Date of Patent: Jul. 26, 2011

(54) WATER-BASED FLUOROPOLYMER COMPOSITION

(75) Inventors: Fabio Polastri, Monza (IT); Tiziana Poggio, Montechiaro d'Acqui (IT); Julio A. Abusleme, Saronno (IT)

(73) Assignee: Solvay Solexis, S.p.A., Milan (IT)

( * ) Notice: Subject to any disclaimer, the term of this patent is extended or adjusted under 35 U.S.C. 154(b) by 0 days.

(21) Appl. No.: 12/095,798

(22) PCT Filed: Dec. 4, 2006

(86) PCT No.: PCT/EP2006/069282
§ 371 (c)(1),
(2), (4) Date: Jun. 2, 2008

(87) PCT Pub. No.: WO2007/065881
PCT Pub. Date: Jun. 14, 2007

(65) Prior Publication Data
US 2009/0018244 A1 Jan. 15, 2009

(30) Foreign Application Priority Data
Dec. 6, 2005 (EP) .................................... 05111744

(51) Int. Cl.
*C08K 5/05* (2006.01)
(52) U.S. Cl. .............. 524/385; 106/14.13; 106/14.41; 427/178; 427/179; 427/427.4; 427/430.1; 428/421; 524/379; 524/386; 524/449; 524/544; 524/545; 524/546; 524/805
(58) Field of Classification Search .............. 524/386, 524/385, 389, 449, 544, 545, 546, 805; 106/14.13, 106/14.41
See application file for complete search history.

(56) References Cited

U.S. PATENT DOCUMENTS

| | | | |
|---|---|---|---|
| 3,624,250 A | 11/1971 | Carlson | |
| 3,745,145 A * | 7/1973 | Khattab | 524/128 |
| 4,053,445 A * | 10/1977 | Schulze | 524/315 |
| 4,070,341 A * | 1/1978 | Schulze | 524/343 |
| 4,513,129 A | 4/1985 | Nakagawa et al. | |
| 4,524,194 A | 6/1985 | Dumoulin | |
| 4,587,286 A * | 5/1986 | Wilkinson | 524/375 |
| 4,739,024 A | 4/1988 | Moggi et al. | |
| 4,933,388 A * | 6/1990 | Blickle et al. | 524/462 |

(Continued)

FOREIGN PATENT DOCUMENTS
EP 0335361 10/1989

(Continued)

OTHER PUBLICATIONS

"Butyl Oxitol", Basic Properties of Common Solvents, Knovel Critical Tables, 2003, Knovel, 2nd edition.*

(Continued)

*Primary Examiner* — Mark Eashoo
*Assistant Examiner* — Nicole M Buie-Hatcher
(74) *Attorney, Agent, or Firm* — Arent Fox LLP (57) ABSTRACT

A fluoropolymer composition comprising: at least one thermoplastic partially fluorinated fluoropolymer [polymer (F)]; water; less than 15% wt (based on total weight of composition) of a water-soluble solvent mixture [mixture (M)] comprising: at least one alcohol solvent [solvent (A)]; at least one glycol derivative solvent having a boiling point of at least 100° C. [solvent (GD)], wherein the solvent (GD) is a derivative of a compound comprising at least two hydroxyl groups, wherein at least one of the hydroxyl group has been derivatized to yield an ether or an ester bond.

20 Claims, 1 Drawing Sheet

U.S. PATENT DOCUMENTS

| | | | |
|---|---|---|---|
| 5,502,097 A | | 3/1996 | Saito |
| 5,597,880 A | | 1/1997 | Abulesme et al. |
| 5,846,645 A | * | 12/1998 | Yokota et al. ............... 428/327 |
| 5,879,746 A | | 3/1999 | Tomihashi et al. ........... 427/379 |
| 6,124,045 A | | 9/2000 | Soda et al. |
| 6,140,408 A | | 10/2000 | McCarthy et al. ............ 524/506 |
| 6,921,787 B2 | | 7/2005 | Bate .............................. 524/386 |
| 2002/0132895 A1 | | 9/2002 | Poggio et al. ................. 524/376 |
| 2003/0031875 A1 | | 2/2003 | Abusleme et al. |
| 2004/0192829 A1 | | 9/2004 | Soda et al. .................... 524/544 |
| 2005/0070659 A1 | | 3/2005 | Shiow-Ling et al. ......... 524/502 |

FOREIGN PATENT DOCUMENTS

| | | |
|---|---|---|
| EP | 1416024 | 5/2004 |
| WO | WO2005012423 A1 | 2/2005 |

OTHER PUBLICATIONS

Basic Properties of Chemical Compounds, Knovel Critical Tables, 2003, Knovel, 2nd edition.*

Drobny, J., Technology of Fluoropolymers, 2001, CRC Press LLC, p. 14.*

"Critical Properties and Acentric Factors", Yaw's Thermophysical Properties of Chemicals and Hydrocarbons, 2010, Knovel, electronic edition.*

"Interactive Table-Chemical Properties of Materials", Hawley's Condensed Chemical Dictionary, 2002, John Wiley & Sons, 14th edition.*

Anonymous : "Halocarbon 1113" Internet Article, [online]; Dec. 5, 2003, retrieved from internet: URL:http//www.megs.ca/puregases/halocarbon_1113.htm> [retrived on Feb. 27, 2006].

Database Polymers [online] copyright 2000,; retrieved from www.polymersdatabase.com/ keyword : ECTFE.

Lyondell : "ARCOSOLV—Propylene Glycol Ethers and Acetates Solvent Selector" ; [online] 2004 retrieved from internet:URL:http//www.lyondell.com/html/products/techlit/2653.pdf> [retrieved on Mar. 3, 2006].

PCT International Preliminary Report on Patentability of Jun. 11, 2008 including the Written Opinion for International Application PCT/EP2006/069282 (7 p.).

PCT Search Report of Mar. 8, 2007 for International Application PCT/EP2006/069282 (3 p.).

EPO Search Report of Mar. 3, 2006 for counterpart European Application No. 05111744.8 as published in EP1795565A1 (3 p.).

Mark S.M. Alger, "Polymer Science Dictionary", London School of Polymer Technology, Polytechnic of North London, UK, published by Elsevier Applied Science, 1989, p. 476 (3 p.).

Kirk-Othmer. Encyclopedia of Chemical Technology. 2nd edition. published by John Wiley , 1963. p. 889-896 (9 p.).

* cited by examiner

WATER-BASED FLUOROPOLYMER COMPOSITION

CROSS-REFERENCE TO RELATED APPLICATIONS

This application is a U.S. national stage application under 35 U.S.C. §371 of International Application No. PCT/EP2006/069282, filed Dec. 4, 2006, which claims priority to European Application No. 05111744.8, filed Dec. 6, 2005, these applications being herein incorporated by reference in their entirety.

TECHNICAL FIELD

The present invention relates to a fluoropolymer composition useful for manufacturing anti-corrosion coatings for metal substrate providing low permeability to water-vapor, good mechanical properties and adhesion to said substrate, to a process for manufacturing said composition, to the use of said composition for coating and to the coated articles thereof.

BACKGROUND ART

Using fluorinated plastics is a well known solution to protect metallic surfaces from corrosion by chemical agents. Their outstanding properties, due to their chemical structure, make them suitable for a wide range of applications in chemical, food, semiconductor and pharmaceutical industries.

Metal equipments used in the Chemical Process Industry (CPI) such as for example tanks, piping, reactors, pumps and valves built for example in brass, aluminum, bronze, stainless steel and carbon steel, are generally protected from the corrosion by using protective coatings based on polymers.

Pumps, tanks, reactors, impellers, tubes and other metallic devices and apparatuses are often coated with a fluoropolymer layer; well-known coating technologies allow obtaining fluoropolymer coating of the desired thickness in a single or more passes.

In the so-called CPI applications, the anti-corrosion coating shall guarantee the thermal, chemical and permeation resistance; with this aim, it is mandatory that said coating possesses no defects (holes, cracks and the like) that can be due to contaminations or processing problems, which might lead to the exposure of the underlying metal surface to the aggressive environment.

To statistically reduce the presence of this kind of damages, it is common practice to prepare such coatings in more than one pass, that is to say coating the metal surface with more than one layer of fluoropolymer. By doing so, should defects be generated when first coating the metal surface, an additional layer is supposed to cover said defects such as to obtain a coating having improved protective properties and increased lifetime.

Fluorinated polymers, especially those based on ECTFE (ethylene/chlorotrifluoroethylene copolymer) having a high Melt Flow Index (>10 g/10 min) are commercially used for their good chemical resistance as coating materials. Nevertheless, said materials generally require the use of a primer composition to improve adhesion to the metal; moreover, cohesion between multiple layers obtained in subsequent passes is generally reduced, so that delamination, blistering and bucking phenomena affect the efficiency of these coatings as anti-corrosive protective layers.

Among the various coating processing methods, those employing polymer dispersions in organic solvents or their aqueous latices and the electrostatic powder coating (EPC) can be mentioned.

Among said methods the electrostatic powder coating (EPC), wherein the polymer particles are electrostatically charged and deposited on the heated and earthed metal surface, have acquired a remarkable importance. Generally, the metal surface is previously cleaned and roughed, for example, by etching and sandblasting, to obtain a higher adhesion of the coating to the substrate and then heated at a temperature higher than the melting temperature of the polymer coating.

Such technique raises nevertheless great health and safety issues especially when coating internal surfaces of tanks or reactors of large dimensions, the operator is obliged to remain close to said hot surfaces (generally kept at temperature of more than 250° C.) generally with at least a part of his body inside the hollow bodies to be internally coated.

From a coating processing point of view, it would be thus preferable to use the fluoropolymers as liquid dispersion.

U.S. Pat. No. 5,502,097 (MITSUI DU PONT FLUORCHEMICAL) 26 Mar. 1996 discloses a water-based dispersion comprising:
- a heat flowable fluororesin;
- a dispersion medium having surface tension of <45 dynes/cm at 20° C., said medium comprising organic liquids, preferably alcohols;
- a high boiling organic liquid having boiling point of 150 to 340° C., preferably ethylene glycol, glycerine, polyethylene glycol.

U.S. Pat. No. 5,879,746 (DAIKIN IND LTD) 9 Mar. 1999 discloses aqueous dispersion compositions comprising:
- a fluorine-containing melt-processable resin powder;
- a water-soluble solvent;
- a surfactant; and
- water.

The water soluble solvents suitable for preparing the composition of U.S. Pat. No. 5,879,746 (DAIKIN IND LTD) 9 Mar. 1999 can be chosen among three classes:
- low boiling point (bp) (bp up to 100° C.) organic solvents;
- middle boiling point (bp from 100 to 150° C.) organic solvents;
- high boiling point (bp >150° C.) organic solvents.

Among high boiling point organic solvents, alcohol solvents are preferred.

U.S. Pat. No. 6,124,045 (DAIKIN IND LTD) 26 Sep. 2000 discloses a coating composition comprising:
- a perfluoropolymer (that is to say a fully fluorinated fluoropolymer);
- a polyether-type surfactant, i.e. a surfactant comprising recurring units of ethylene and/or propylene oxide [—$CH_2$—$CH_2$—O— and/or —$CH(CH_3)CH_2$—O— type];
- a liquid carrier, which is preferably a mixture of water with an alcohol, such as, inter alia, methanol, ethanol, isopropyl alcohol, ethylene glycol, diethylene glycol, triethylene glycol or glycerin.

US 2004192829 (DAIKIN IND LTD) 30 Sep. 2004 discloses an aqueous dispersion comprising:
- resin particles, like notably fluororesin or non-fluororesin particles;
- a non-ionic surfactant, like notably a polyoxyalkylene alkyl ether-type surfactant;
- water; and
- optionally, a liquid organic compound having a hydrophilic group, preferably a polyol or an aromatic hydrocarbon solvent.

EP 1416024 A (DAIKIN IND LTD) 6 May 2004 discloses an aqueous dispersion of fluororesin for coating comprising:
(A) fluororesin particles;
(B) a nitrogen-free high boiling point polyol having a boiling point of at least 100° C. and comprising at least 2 hydroxyl groups;
(C) a depolymerizable acrylic resin; and
(D) a non-ionic surfactant, like notably polyoxyalkylene alkyl ether-type surfactant and polyoxyethylene alkylphenol-type surfactant.

EP 335361 A (DAIKIN IND LTD) 4 Oct. 1989 discloses an electrodeposition coating composition comprising a fluorine-containing copolymer, a curing agent and an aqueous medium; thus, example 1 discloses a varnish comprising dimethyl ethanol amine and butyl cellosolve.

U.S. Pat. No. 6,140,408 31 Oct. 2000 discloses room temperature coalescable aqueous fluoropolymer dispersions which can comprise coalescing agents like notably (di)ethylene glycols alkyl ethers, and surfactants, like notably alkyl/aryl carboxylates ou sulfonates, e.g. TRITON XL-80N.

Dispersions of fluoropolymers of the prior art, especially dispersions of ECTFE, having suitable film-forming and adhesion properties, require thus the use of appropriate dispersing media, generally containing non negligible amounts of organic solvents which can have harmful environmental impact. Thus, while avoiding health and safety issues, these solutions add environmental concerns related to the presence of said solvents.

Increased attention to the environmental hazard prevention has thus generated a strong need for moving towards composition having reduced environmental impact, that is to say comprising less and less solvent, while maintaining or even improving coating performances.

Another characteristic of anticorrosion layers is the low permeability against chemical substances. Particularly critical for fluoroplastics is the water vapor resistance. When the permeability to water vapor under severe operating conditions is too high, said vapor can penetrate the anti-corrosion coating and accumulate between the anti-corrosion layer and the metal surface. As a consequence, the protective coating is progressively delaminated from the surface to be protected, and buckling and blistering phenomena can considerably reduce its effectiveness and lifetime.

There is thus a need in the art for fluoropolymer compositions that provide both for good adhesion to metal surfaces and for good cohesion between successive layers, with no need of adhesive, tie-layers or primers, and that can be processed into coatings on metals with more health and safety-friendly techniques, which possess limited environmental impact and which exhibit improved mechanical properties and water vapor resistance, yielding improved protective performances and lifetimes.

DISCLOSURE OF INVENTION

Now, it has been discovered that the above-mentioned difficulties are remarkably overcome by a fluoropolymer composition as below detailed. The object of the present invention is therefore to provide a fluoropolymer composition with improved adhesion properties, which is easy to process and comprise reduced amount of solvent having limited environmental impact, and which maintains, over the course of its use, outstanding water vapour resistance over a wide operating temperature range.

BRIEF DESCRIPTION OF THE INVENTION

The present invention relates to a fluoropolymer composition comprising at least one thermoplastic partially fluorinated fluoropolymer [polymer (F)];
water;
less than 15% wt (based on total weight of composition) of a water-soluble solvent mixture [mixture (M)] comprising
at least one alcohol solvent [solvent (A)];
at least one glycol derivative solvent having a boiling point of at least 100° C. [solvent (GD)].

The composition according to the invention can be applied on cold surfaces avoiding dangerous processing operations at high temperature, such as those required for the EPC technique.

Thus, by means of the composition of the invention, anti-corrosion coatings can be prepared by a safe process which does not raise the serious safety issues of the EPC technique.

The compositions of the invention advantageously comprise limited amount of solvents; moreover said solvents have low environmental impact and low toxicity.

The anti-corrosion coatings comprising the composition of the invention advantageously possess improved mechanical properties, reduced water vapor permeability and thus improved lifetimes. In particular, by using the composition of the invention, it can be possible to obtain by liquid spray coating fluoropolymer layers having the outstanding water vapor permeability performances as those described in US 2003/0031875.

Furthermore, the composition according to the invention advantageously provide for single or multiple layers anti-corrosion coatings having both outstanding adhesion to the metal surface and cohesion between fluoropolymer layers, so that there is no need of applying an additional binder coating on the metal surface and so that it is possible to obtain an anti-corrosion layer having improved barrier properties.

Another object of the present invention is a process for manufacturing said composition.

Still another object of the invention is the use of the composition of the invention for coating.

Still another object of the invention is a coated article, obtained using the composition of the invention.

DETAILED DESCRIPTION OF THE INVENTION

The mention "at least one thermoplastic partially fluorinated fluoropolymer (F)" is intended to denote one or more than one polymer (F).

Preferably the composition of the invention comprises only one polymer (F).

In the rest of the text, the expressions "partially fluorinated fluoropolymer (F)" and "polymer (F)" are understood, for the purposes of the present invention, both in the plural and the singular.

The polymer (F) of the invention should be thermoplastic.

The term "thermoplastic" is understood to mean, for the purposes of the present invention, polymers existing, at room temperature, below their glass transition temperature, if they are amorphous, or below their melting point if they are semi-crystalline, and which are linear (i.e. not reticulated). These polymers have the property of becoming soft when they are heated and of becoming rigid again when they are cooled, without there being an appreciable chemical change. Such a definition may be found, for example, in the encyclopedia called "Polymer Science Dictionary", Mark S. M. Alger, London School of Polymer Technology, Polytechnic of North London, UK, published by Elsevier Applied Science, 1989.

Thermoplastic polymers are thus distinguishable from elastomers.

To the purpose of the invention, the term "elastomer" is intended to designate a true elastomer or a polymer resin serving as a base constituent for obtaining a true elastomer.

True elastomers are defined by the ASTM, Special Technical Bulletin, No. 184 standard as materials capable of being stretched, at room temperature, to twice their intrinsic length and which, once they have been released after holding them under tension for 5 minutes, return to within 10% of their initial length in the same time.

Polymer resins serving as a base constituent for obtaining true elastomers are in general amorphous products having a glass transition temperature ($T_g$) below room temperature. In most cases, these products correspond to copolymers having a $T_g$ below 0° C. and including reactive functional groups (optionally in the presence of additives) allowing the true elastomer to be formed.

Preferably, polymer (F) is semi-crystalline.

The term "semi-crystalline" is intended to denote a polymer having a heat of fusion of more than 1 J/g when measured by Differential Scanning Calorimetry (DSC) at a heating rate of 1° C./min, according to ASTM D 3418.

Preferably, the polymer (F) of the invention has a heat of fusion of at least 5 J/g, more preferably of at least 10 J/g.

The melt flow index of the polymer (F) is advantageously measured according to ASTM D-1238 standard under a piston load of 2.16 kg at a temperature chosen as a function of the chemical nature of polymer (F), as detailed in paragraph 8.2 of said standard.

The melt index of the polymer (F) is advantageously less than 10, preferably less than 8, more preferably less than 7 g/10 min, even more preferably less than 5 g/10 min, most preferably less than 3 g/10 min.

Coatings made from compositions comprising polymer (F) having melt index of less than 10 g/10 min can be notably bended without rupture or cracking, can withstand mechanical shocks and advantageously exhibit outstanding mechanical properties.

On the contrary, coatings made from compositions comprising polymer (F) of lower molecular weight are typically less mechanically performing and can undergo brittle fractures.

To the purpose of the present invention, the term "partially fluorinated fluoropolymer" is intended to denote any polymer comprising:
recurring units derived from at least one fluorinated monomer; and
recurring units derived from at least one ethylenically unsaturated monomer comprising at least one hydrogen atom (hereinafter, hydrogen-containing monomer).

The fluorinated monomer and the hydrogen-containing monomer may be the same monomer or may be different monomers.

The partially fluorinated fluoropolymer comprises advantageously more than 1% mol, preferably more than 5% mol, more preferably more than 10% mol of recurring units derived from the hydrogen-containing monomer.

The partially fluorinated fluoropolymer comprises advantageously more than 25% mol, preferably more than 30% mol, more preferably more than 40% mol of recurring units derived from the fluorinated monomer.

The fluorinated monomer can further comprise one or more other halogen atoms (Cl, Br, I). Should the fluorinated monomer be free of hydrogen atom, it is designated as per (halo)fluoromonomer. Should the fluorinated monomer comprise at least one hydrogen atoms, it is designated as hydrogen-containing fluorinated monomer.

Should the fluorinated monomer be a hydrogen-containing fluorinated monomer, such as for instance vinylidene fluoride, trifluoroethylene, vinylfluoride, the partially fluorinated fluoropolymer can be either a homopolymer comprising recurring units derived from said hydrogen-containing fluorinated monomer, or a copolymer comprising recurring units derived from said hydrogen-containing fluorinated monomer and from at least one other comonomer.

The comonomer can be either hydrogenated (i.e. free of fluorine atom) or fluorinated (i.e. containing at least one fluorine atom).

Should the fluorinated monomer be a per(halo)fluoromonomer, such as for instance tetrafluoroethylene, chlorotrifluoroethylene, hexafluoropropylene, perfluoroalkylvinylethers, the partially fluorinated fluoropolymer is a copolymer comprising recurring units derived from said per (halo)fluoromonomer and from at least one other comonomer, said comonomer being a hydrogen-containing monomer as above described, such as for instance ethylene, propylene, vinylethers, acrylic monomers, vinylidene fluoride, trifluoroethylene, vinylfluoride.

Preferred partially fluorinated fluoropolymer are those wherein the fluorinated monomer is chosen from the group consisting of tetrafluoroethylene (TFE), vinylidene fluoride (VdF) and chlorotrifluoroethylene (CTFE).

Non limitative examples of suitable hydrogenated comonomers are notably ethylene, propylene, vinyl monomers such as vinyl acetate, acrylic monomers, like methyl methacrylate, butyl acrylate, acrylic acid, methacrylic acid and hydroxyethyl acrylate, as well as styrene monomers, like styrene and p-methylstyrene.

Non limitative examples of suitable fluorinated comonomers are notably $C_3$-$C_8$ perfluoroolefins, such as hexafluoropropene;

$C_2$-$C_8$ hydrogenated monofluoroolefins, such as vinyl fluoride;

1,2-difluoroethylene, vinylidene fluoride, and trifluoroethylene;

perfluoroalkylethylenes complying with formula $CH_2$=$CH$—$R_{f0}$, in which $R_{f0}$ is a $C_1$-$C_6$ perfluoroalkyl;

chloro- and/or bromo- and/or iodo-$C_2$-$C_6$ fluoroolefins, like chlorotrifluoroethylene;

(per)fluoroalkylvinylethers complying with formula $CF_2$=$CFORf_1$ in which $Rf_1$ is a $C_1$-$C_6$ fluoro- or perfluoroalkyl, e.g. $CF_3$, $C_2F_5$, $C_3F_7$;

$CF_2$=$CFOX_0$ (per)fluoro-oxyalkylvinylethers, in which $X_0$ is a $C_1$-$C_{12}$ alkyl, or a $C_1$-$C_{12}$ oxyalkyl, or a $C_1$-$C_{12}$ (per)fluorooxyalkyl having one or more ether groups, like perfluoro-2-propoxy-propyl;

(per)fluorooxyalkylvinylethers complying with formula $CF_2$=$CFOCF_2ORf_2$ in which $R_{f2}$ is a $C_1$-$C_6$ fluoro- or perfluoroalkyl, e.g. $CF_3$, $C_2F_5$, $C_3F_7$ or a $C_1$-$C_6$ (per) fluorooxyalkyl having one or more ether groups, like —$C_2F_5$—O—$CF_3$;

functional (per)fluoroalkylvinylethers complying with formula $CF_2$=$CFOY_0$, in which $Y_0$ is a $C_1$-$C_{12}$ alkyl or (per)fluoroalkyl, or a $C_1$-$C_{12}$ oxyalkyl, or a $C_1$-$C_{12}$ (per)

fluorooxyalkyl having one or more ether groups and $Y_0$ comprising a carboxylic or sulfonic acid group, in its acid, acid halide or salt form;

fluorodioxoles, especially perfluorodioxoles.

More preferably, the partially fluorinated fluoropolymer are chosen among (F-1) Vinylidene fluoride (VdF) polymers, optionally comprising reduced amounts, generally comprised between 0.1 and 15% by moles, of one or more fluorinated comonomer(s) (see for instance U.S. Pat. No. 4,524,194 (SOLVAY) 18 Jun. 1985 and U.S. Pat. No. 4,739,024 (MONTEFLUOS SPA) 19 Apr. 1988), and optionally further comprising one or more fluorinated or hydrogenated comonomer(s); (F-2) TFE and/or CTFE copolymers with ethylene, propylene or isobutylene (preferably ethylene), with a molar ratio per(halo)fluoromonomer(s)/hydrogenated comonomer(s) of from 30:70 to 70:30, optionally containing one or more comonomers in amounts of from 0.01 to 30% by moles, based on the total amount of TFE and/or CTFE and hydrogenated comonomer(s) (see for instance U.S. Pat. No. 3,624,250 (DU PONT) 30 Nov. 1971 and U.S. Pat. No. 4,513,129 (DAIKIN IND LTD) 23 Apr. 1985).

The VdF polymers (F-1) preferably comprise:
(a') at least 60% by moles, preferably at least 75% by moles, more preferably at least 85% by moles of vinylidene fluoride (VdF);
(b') optionally from 0.1 to 15%, preferably from 0.1 to 12%, more preferably from 0.1 to 10% by moles of a fluorinated comonomer chosen among vinylfluoride ($VF_1$), chlorotrifluoroethylene (CTFE), hexafluoropropene (HFP), tetrafluoroethylene (TFE), trifluoroethylene (TrFE), perfluoromethylvinylether (PMVE) and mixtures therefrom; and
(c') optionally from 0.1 to 5%, by moles, preferably 0.1 to 3% by moles, more preferably 0.1 to 1% by moles, based on the total amount of monomers (a') and (b'), of one or more fluorinated or hydrogenated comonomer(s).

As non limitative examples of the VdF polymers useful in the present invention, mention can be notably made of homopolymer of VdF, VdF/TFE copolymer, VdF/TFE/HFP copolymer, VdF/TFE/CTFE copolymer, VdF/TFE/TrFE copolymer, VdF/CTFE copolymer, VdF/HFP copolymer, VdF/TFE/HFP/CTFE copolymer, VdF/TFE/perfluorobutenoic acid copolymer, VdF/TFE/maleic acid copolymer and the like.

The melt index of the VdF polymer is advantageously at least 0.01, preferably at least 0.05, more preferably at least 0.1 g/10 min.

The melt index of the VdF polymer is advantageously less than 10, preferably less than 7.5, more preferably less than 5 g/10 min, most preferably less than 3 g/10 min.

The melt index of VdF polymer is measured in accordance with ASTM test No. D 1238, run at 230° C., under a piston load of 2.16 kg.

The VdF polymer has a melting point ($T_{m2}$) advantageously of at least 120° C., preferably at least 125° C., more preferably at least 130° C.

The VdF polymer has a melting point ($T_{m2}$) advantageously of at most 190° C., preferably at most 185° C., more preferably at most 180° C.

The melting point ($T_{m2}$) is determined by DSC, at a heating rate of 10° C./min, according to ASTM D 3418.

Even more preferably, the partially fluorinated fluoropolymer is a CTFE or TFE copolymers (F-2). Among F-2 polymers, ECTFE polymers are preferred.

The CTFE or TFE copolymers (F-2) preferably comprise:
(a) from 35 to 65%, preferably from 45 to 55% more preferably from 48 to 52% by moles of ethylene (E);
(b) from 65 to 35%, preferably from 55 to 45% more preferably from 52 to 48% by moles of chlorotrifluoroethylene (CTFE) (for the ECTFE copolymers, hereinafter) and/or tetrafluoroethylene (TFE) (for the ETFE copolymers, hereinafter); and
(c) optionally, from 0.1 to 30%, by moles, preferably 0.1 to 10% by moles, more preferably 0.1 to 5% by moles, based on the total amount of monomers (a) and (b), of one or more fluorinated comonomer(s) (c1) and/or hydrogenated comonomer(s) (c2).

Among fluorinated comonomers (c1) we can for example mention (per)fluoroalkylvinylethers [such as perfluoropropylvinylether (PPVE), of formula $CF_2=CFO-C_3F_7$], (per)fluoroalkylethylenes [such as 3,3,3-trifluoro 2-trifluoromethyl propene (also known as hexafluoroisobutene or HFIB) and perfluorobutylethylene], (per)fluorodioxoles, like those described in U.S. Pat. No. 5,597,880 (AUSIMONT SPA) 28 Jan. 1997 [such as 2,2,4-trifluoro-5-trifluoromethoxy-1,3-dioxole (TTD) or 2,2-bistrifluoromethyl-4,5-difluoro-1,3-dioxole (PDD)], vinylidenefluoride (VdF).

As non limitative examples of hydrogenated comonomers (c2), mention may be notably made of those having the general formula;

$$CH_2=CH-(CH_2)_n R_1 \qquad (I)$$

wherein $R_1=OR_2$, or $-(O)_t CO(O)_p R_2$ wherein t and p are integers equal to 0.1 and $R_2$ is a $C_1$-$C_{20}$ hydrogenated radical, of alkyl type, linear or branched when possible, or cycloalkyl, optionally containing heteroatoms and/or chlorine atoms, the heteroatoms preferably being O or N, $R_2$ optionally contains one or more functional groups, preferably selected from OH, COOH, epoxide, ester and ether, $R_2$ optionally contains double bonds, or $R_2$ is H, n is an integer in the range 0-10. Preferably $R_2$ is hydrogen or of alkyl type from 1 to 10 carbon atoms containing functional groups of hydroxide type, n is an integer in the range 0-5.

The preferred hydrogenated comonomers (c2) are selected from the following classes:
1) Acrylic monomers having the general formula:

$$CH_2=CH-CO-O-R_2$$

wherein $R_2$ has the above mentioned meaning.

As non limitative examples of suitable acrylic monomers, mention can be notably made of ethylacrylate, n-butylacrylate, acrylic acid, hydroxyethylacrylate, hydroxypropylacrylate, (hydroxy)ethylhexylacrylate.

2) Vinylether monomers having the general formula:

$$CH_2=CH-O-R_2$$

wherein $R_2$ has the above mentioned meaning.

As non limitative examples of suitable vinylether monomers, mention can be notably made of propylvinylether, cyclohexylvinylether, vinyl-4-hydroxybutylether.

3) Vinyl monomers of the carboxylic acid having the general formula:

$$CH_2=CH-O-CO-R_2$$

wherein $R_2$ has the above mentioned meaning.

As non limitative examples of suitable vinyl monomers of the carboxylic acid, mention can be notably made of vinylacetate, vinylpropionate, vinyl-2-ethylhexanoate.

4) Unsaturated carboxylic acid monomers having the general formula:

$$CH_2=CH-(CH_2)_n-COOH$$

wherein n has the above mentioned meaning. As non limitative example of suitable unsaturated carboxylic acid monomer, mention can be notably made of vinylacetic acid.

More preferred comonomer (c2) is n-butylacrylate.

Among comonomers (c1) and/or (c2) are preferred those chosen among the group consisting of 3,3,3-trifluoro-2-trifluoromethylpropene (HFIB), perfluoropropylvinylether (PPVE), 2,2,4-trifluoro-5-trifluoromethoxy-1,3-dioxole (TTD), n-butylacrylate and mixtures thereof.

Still more preferably, the partially fluorinated fluoropolymer is a CTFE copolymer (ECTFE), as above described.

Most preferably, the partially fluorinated fluoropolymer is a CTFE copolymer (ECTFE) consisting essentially of:
(a) from 35 to 65%, preferably from 45 to 55% more preferably from 48 to 52% by moles of ethylene (E);
(b) from 65 to 35%, preferably from 55 to 45% more preferably from 52 to 48% by moles of chlorotrifluoroethylene (CTFE).

The most preferred ECTFE copolymer may further comprise (in addition to recurring units derived from ethylene and chlorotrifluoroethylene, as above detailed) other moieties (e.g. end groups), residues, additives and ingredients which are used in the manufacturing process. Said components are generally present in reduced amount, typically as traces, and do not interfere with the properties and chemical behavior of the ECTFE.

Most preferred ECTFE copolymers are thus typically those free from recurring units derived from comonomers (c1) and/or (c2).

The melt index of the ECTFE is advantageously at least 0.01, preferably at least 0.05, more preferably at least 0.1 g/10 min.

The melt index of the ECTFE is advantageously less than 10, preferably less than 7.5, more preferably less than 6 g/10 min, even more preferably less than 5 g/10 min, most preferably less than 3 g/10 min.

The melt index of ECTFE is measured in accordance with ASTM test No. 1238, run at 275° C., under a piston load of 2.16 kg.

Coatings made from compositions comprising ECTFE having melt index of less than 10 g/10 min exhibit advantageously good mechanical properties (in particular outstanding elastic modulus, yield stress, elongation at break), good resistance to deformation (e.g. in flexion) and to mechanical shocks (no brittleness).

On the contrary, when the melt index of the ECTFE polymer exceed 10 g/10 min, coatings having poorer properties are obtained therefrom, which have a more brittle behavior and are less resistant to deformations.

The ECTFE has a melting point ($T_{m2}$) advantageously of at least 200° C., preferably of at least 220° C., more preferably of at least 230° C., even more preferably of at least 235° C.

The ECTFE has a melting point ($T_{m2}$) advantageously of at most 260° C., preferably of at most 265° C.

Good results have been obtained with ECTFE polymers having a melting point ($T_{m2}$) in the range between 230 and 265° C.

Very good results have been obtained with ECTFE polymers having a melting point ($T_{m2}$) in the range between 235° C. and 265° C.

The melting point ($T_{m2}$) is determined by Differential Scanning Calorimetry (DSC), at a heating rate of 1° C./min, according to ASTM D 3418 Standard.

Particularly adapted to the composition of the invention is ECTFE available from Solvay Solexis S.p.A., under the tradename HALAR®.

The composition of the invention advantageously comprises at least 5% wt, preferably at least 7.5% wt, most preferably at least 10% wt of polymer (F), with respect to the total weight of the composition.

The composition of the invention advantageously comprises at most 70% wt, preferably at most 65% wt, most preferably at most 50% wt of polymer (F), with respect to the total weight of the composition.

The polymer (F) is generally present in the composition of the invention under the form of particles having an average particle size of advantageously at most 2000 µm, preferably at most 1500 µm, more preferably at most 500 µm, still more preferably at most 250 µm and advantageously at least 0.1 µm, preferably at least 1 µm, more preferably at least 10 µm.

The average particle size of polymer (F) particles can be notably measured according to standard sieving methods, following ASTM D1921 standard (for larger particles) or via photon correlation spectroscopy (PCS), following ISO 13321 standard (for smaller particles), which are well-known to the skilled in the art.

For the purpose of the invention the term "particle" is intended to denote a mass of material that, from a geometrical point of view, has a definite three-dimensional volume and shape, characterized by three dimensions, wherein none of said dimensions exceed the remaining two other dimensions of more than 200%. Particles are generally not equidimensional, i.e. that are longer in one direction than in others.

The shape of a particle can be notably expressed in terms of the sphericity $\phi_s$, which is independent of particle size. The sphericity of a particle is the ratio of the surface-volume ratio of a sphere with equal volume as the particle and the surface-volume ratio of the particle. For a spherical particle of diameter $D_p$, $\phi_s=1$; for a non-spherical particle, the sphericity is defined as $$\Phi_s = \frac{6 \cdot v_p}{D_p \cdot S_p}$$

wherein:
$D_p$ is the equivalent diameter of particle;
$S_p$ is the surface area of one particle;
$v_p$ is the volume of one particle.

The equivalent diameter is defined as the diameter of a sphere of equal volume. $D_p$ is usually taken to be the nominal size based on screen analysis or microscopic analysis. The surface area is found from adsorption measurements or from the pressure drop in a bed of particles.

The particles of polymer (F) have a sphericity $\phi_s$ of advantageously at least 0.6, preferably at least 0.65, more preferably at least 0.7. Good results have been obtained with particles having a $\phi_s$ from 0.7 to 0.95.

Particles of polymer (F) are generally obtained from suspension polymerization.

The term particles is thus to be intended distinguishable from pellets, which are obtained when extruding polymer (F) in the molten state into strands and chopping the strands into pellets To the purpose of the present invention, the term "alcohol solvent" [solvent (A)] is intended to denote an organic solvent comprising at least one hydroxyl group, said solvent being free from functional groups other than said hydroxyl groups.

The composition of the invention can comprise one or more than one solvent (A); preferably it comprises at least two solvents (A).

In the rest of the text, the expressions "alcohol solvent" and "solvent (A)" are understood, for the purposes of the present invention, both in the plural and the singular, that is to say that the inventive composition may comprise one or more than one solvent (A).

As used herein, the term "functional group" has its general meaning as intended in organic chemistry and it encompasses atoms or combination of atoms bonded to the carbon skeleton of the alcohol solvent, which confers to the solvent (A) specific reactivity and chemical properties. Non limitative examples of "functional groups" are notably ester groups, ether groups, carboxyl groups and the like.

The term "alcohol solvent" encompasses thus

(i) alcohols comprising only one hydroxyl group, such as for instance isopropyl alcohol (IPA); as well as
(ii) polyols comprising two or more hydroxyl group, like diols comprising two hydroxyl groups, such as ethylene glycol (EG) and polyols comprising three hydroxyl groups such as glycerin.

Preferably the solvent (A) is chosen among (A-1) aliphatic, aromatic or alkyl-aromatic alcohols of general formula $R_H$—OH, wherein $R_H$ is a $C_1$-$C_6$ hydrocarbon group, linear or branched, optionally substituted; aliphatic alcohols are preferred. Examples of aliphatic alcohols suitable for the invention are notably methanol, ethanol, isopropyl alcohol (IPA); preferred aliphatic alcohol is IPA;

(A-2) diols of general formula HO—$R_{H'}$—OH, wherein $R_{H'}$ is a $C_1$-$C_{10}$ divalent hydrocarbon group, linear or branched; examples of diols suitable for the invention are notably ethylene glycol (EG), propylene glycol (or 1,2-propanediol) (PG), 1,4-butanediol (BG), 1,5-pentanediol, 2-butene-1,4-diol, and the like; preferred diol is EG;

(A-3) triols, of general formula:

wherein $R_{H*}$ is a $C_1$-$C_{10}$ trivalent hydrocarbon group, linear or branched; examples of diols suitable for the invention are notably glycerin, 2-ethyl-2-hydroxymethyl-1,3-propanediol, 1,2,6-hexanetriol; of these, glycerin is preferred in view of cost and safety.

More preferably the solvent (A) comprise one or two hydroxyl groups, that is to say it is chosen among (A-1) and (A-2) compounds as above described.

In the rest of the text, the expressions "glycol derivative solvent" and "solvent (GD)" are understood, for the purposes of the present invention, both in the plural and the singular, that is to say that the inventive composition may comprise one or more than one solvent (GD).

The solvent (GD) has a boiling point of at least 100° C., preferably of at least 120° C., more preferably at least 140° C.

The boiling point of the solvent (GD) is advantageously measured at 760 mmHg.

The applicant has found that the presence of such high boiling solvent (GD) is particularly advantageous in view of preventing mud crack when drying the aqueous dispersion composition of the present invention after application on a surface. The aqueous dispersion after application on a surface is usually dried at room temperature to about 150° C. When drying, water evaporates first, which could cause development of spaces between the resin particles, which becomes a cause of mud crack: in view of this, the presence of the solvent (GD) is particularly beneficial in view of its slower evaporation speed.

To the purpose of the present invention, the term "glycol derivative solvent" [solvent (GD)] is intended to denote a derivative of a compound comprising at least two hydroxyl group, wherein at least one of the hydroxyl group has been derivatized to yield an ether or an ester bond.

Preferred solvents (GD) comply with general formula (I):

wherein
$R_{HC}$ is a $C_1$-$C_6$ divalent hydrocarbon group, linear or branched, optionally containing one or more ether bonds;
X and Y, equal or different each other, are independently an hydrogen atom, a $C_1$-$C_6$ alkyl group, linear or branched, or a group of formula —C(O)—$R_{H''}$, with $R_{H''}$ being a $C_1$-$C_6$ alkyl group, linear or branched, with the provision that at least one of X and Y is not an hydrogen atom;
n is an integer between 1 and 3.

When the groups X and/or Y comprise more than 6 carbon atoms, then the solvent (GD) acquire a lipophilic character, which generally make it unsuitable for being solubilized in water.

More preferably the solvent (GD) complies with formula (II) here below:

wherein
R1 is an hydrogen atom or a $C_1$-$C_6$ hydrocarbon group, linear or branched; preferably R1 is a hydrogen atom or a methyl group;
$X_1$ and $Y_1$, equal or different each other, are independently an hydrogen atom, a $C_1$-$C_6$ alkyl group, linear or branched, or a group of formula —C(O)—$R_{H''}$, with $R_{H''}$ being a $C_1$-$C_6$ alkyl group, linear or branched; with the provision that at least one of $X_1$ and $Y_1$ is not an hydrogen atom;
m is an integer between 1 and 3.

Most preferably the solvent (GD) complies with formula (III) here below:

wherein
R2 is an hydrogen atom or a methyl group;
$X_2$ and $Y_2$, equal or different each other, are independently an hydrogen atom, a —$R_{H\#}$ group or a —C(O)—$R_{H\#}$ group, with $R_{H\#}$ being a $C_1$-$C_4$ alkyl group, with the provision that at least one of $X_2$ and $Y_2$ is not an hydrogen atom;
p is an integer between 1 and 3.

Non limitative examples of solvents (GD) which gave good results in the composition of the invention are notably:

(E-I) ethylene glycol derivatives, such as:
ethylene glycol monomethyl ether, of formula $CH_3OCH_2CH_2OH$, commercially available as Methyl CELLOSOLVE® from The Dow Chemical Company;
ethylene glycol monobutyl ether, of formula $n-C_4H_9OCH_2CH_2OH$, commercially available as Butyl CELLOSOLVE® from The Dow Chemical Company;
ethylene glycol monopropyl ether, of formula $n-C_3H_7OCH_2CH_2OH$, commercially available as Propyl CELLOSOLVE® from The Dow Chemical Company;
(E-II) diethylene glycol derivatives, such as:
diethylene glycol monomethyl ether, of formula $CH_3O(CH_2CH_2O)_2H$, commercially available as Methyl CARBITOL® from The Dow Chemical Company;
diethylene glycol monoethyl ether, of formula $C_2H_5O(CH_2CH_2O)_2H$, commercially available as CARBITOL® Solvent from The Dow Chemical Company;
diethylene glycol monobutyl ether, of formula $n-C_4H_9O(CH_2CH_2O)_2H$, commercially available as Butyl CARBITOL® from The Dow Chemical Company;
diethylene glycol n-butyl ether acetate, of formula $n-C_4H_9O(CH_2CH_2O)_2C(O)CH_3$, commercially available as Butyl CARBITOL® Acetate from The Dow Chemical Company;
(E-III) triethylene glycol derivatives, such as:
methoxy-, ethoxy- or butoxy-triglycol, of formula, respectively, $CH_3O(CH_2CH_2O)_3H$, $C_2H_5O(CH_2CH_2O)_3H$, $n-C_4H_9O(CH_2CH_2O)_3H$, commercially available from The Dow Chemical Company;
(P-I) propylene glycol derivatives, such as:
propylene glycol methyl ether, of formula $CH_3OCH_2CH(CH_3)OH$, commercially available as DOWANOL® PM from The Dow Chemical Company;
propylene glycol methyl ether acetate, of formula $CH_3OCH_2CH(CH_3)OC(O)CH_3$, commercially available as DOWANOL® PMA from The Dow Chemical Company;
propylene glycol n-butyl ether, of formula $n-C_4H_9OCH_2CH(CH_3)OH$, commercially available as DOWANOL® PnB from The Dow Chemical Company;
propylene glycol n-propyl ether, of formula $n-C_3H_7OCH_2CH(CH_3)OH$, commercially available as DOWANOL® PnP from The Dow Chemical Company;
(P-II) dipropylene glycol derivatives, such as:
dipropylene glycol methyl ether, of formula $CH_3O[CH_2CH(CH_3)O]_2H$, commercially available as DOWANOL® DPM from The Dow Chemical Company;
dipropylene glycol methyl ether acetate, of formula $CH_3O[CH_2CH(CH_3)O]_2C(O)CH_3$, commercially available as DOWANOL® DPMA from The Dow Chemical Company;
dipropylene glycol n-butyl ether, of formula $n-C_4H_9O[CH_2CH(CH_3)O]_2H$, commercially available as DOWANOL® DPnB from The Dow Chemical Company;
dipropylene glycol n-propyl ether, of formula $n-C_3H_7O[CH_2CH(CH_3)O]_2H$, commercially available as DOWANOL® DPnP from The Dow Chemical Company or as ARCOSOLV® DPnP from Lyondell;
dipropylene glycol dimethyl ether, of formula $CH_3O[CH_2CH(CH_3)O]_2CH_3$, commercially available as POLYGLYDE® DMM from The Dow Chemical Company;
(P-III) tripropylene glycol derivatives, such as
tripropylene glycol methyl ether, of formula $CH_3O[CH_2CH(CH_3)O]_3H$, commercially available as DOWANOL® TPM from The Dow Chemical Company;
tripropylene glycol n-butyl ether, of formula $n-C_4H_9O[CH_2CH(CH_3)O]_3H$, commercially available as DOWANOL® DPnB from The Dow Chemical Company;

Solvents (GD) which have been found particularly suitable for the purpose of the invention are propylene (P-I), dipropylene (P-II) and tripropylene (P-III) glycol derivatives as above described.

Solvents (GD) of types (P-I), (P-II) and (P-III) as above detailed are particularly advantageous in view of their limited environmental impact and low toxicity.

The inventive composition comprise less than 15% wt, preferably less than 12% wt, more preferably less than 10% wt (based on total weight of composition) of a water-soluble solvent mixture [mixture (M)] comprising solvent (A) and solvent (GD) as above defined.

The inventive composition comprise at least 0.1% wt, preferably at least 0.5% wt, more preferably at least 1% wt (based on total weight of composition) of a water-soluble solvent mixture [mixture (M)] comprising solvent (A) and solvent (GD) as above defined.

The solvent mixture (M) advantageously comprises solvent (A) and solvent (GD) in a weight ratio of 20/80 to 80/20, preferably in a weight ratio of 25/75 to 75/25, more preferably in a weight ratio of 30/70 to 70/30, even more preferably in a weight ratio of 40/60 to 60/40.

Good results have been obtained with solvent mixture (M) comprising solvent (A) and solvent (GD) in a weight ratio of 50/50.

To the purpose of the invention, it is essential for the solvent mixture to be water-soluble, that is to say that, when the mixture (M) is added in the water-based composition of the invention, a unique homogeneous liquid phase is formed.

This generally requires that the Hildebrand solubility parameter $\delta_T$ of the mixture (M), that is to say the square root of the cohesive energy density (CED) of said mixture (M), fall within the range of 12 to 35 $MPa^{1/2}$.

The Hildebrand solubility parameter $\delta_T$ of the mixture (M) is preferably at least 15, more preferably at least 16, even more preferably at least 18, most preferably at least 20.

The Hildebrand solubility parameter $\delta_T$ of the mixture (M) is preferably at most 34, more preferably at most 33, even more preferably at most 32.

A discussion of solubility parameters can be found in, for instance, KIRK-OTHMER. Encyclopedia of Chemical Technology. 2nd edition. John Wiley, 1963. p. 889-896. As a reminder, the solubility parameter is typically a measure of all interactions that occur between molecules of the solvent or mixture of solvents. As a reminder, the Hildebrand solubility parameter value of a solvent mixture can be determined by averaging the $\delta_T$ values of the individual solvents by volume.

According to the Hansen three parameters approach, the solubility parameter can be analyzed in three parts, a dispersion force component, a hydrogen bonding component and a polar component. Thus, the root mean square of dispersion, and polar and hydrogen bonding components of the solubility parameter equals the solubility parameter (eq. 1). The mixtures (M) useful for the purpose of the invention preferably have the following Hansen component parameters of the total solubility parameter $\delta_T$:

| | |
|---|---|
| dispersion component, $\delta_D$ | from 8.0 to 18.0 $MPa^{1/2}$ |
| polar component, $\delta_P$ | from 2.0 to 13.0 $MPa^{1/2}$ |
| hydrogen bonding component, $\delta_H$ | from 5.0 to 30.0 $MPa^{1/2}$ | wherein the equation 1, here below, describes the relationship of the various components to the total solubility parameters:

$$\delta_T^2 = \delta_D^2 + \delta_P^2 + \delta_H^2 \quad \text{(eq. 1)}$$

The solvent mixture (M) may optionally comprise a surfactant (cationic, anionic or non-ionic), preferably a non-ionic surfactant, more preferably a non-ionic surfactant chosen among alkylphenol-type surfactants (e.g. Triton® X from Union Carbide) and polyoxyethylene or polyoxypropylene alkyl-ether-type nonionic surfactants (e.g. Dispanol® TOC available from NOF Corporation), such as, for instance, those described in US 2004192829 (DAIKIN IND LTD) 30 Sep. 2004.

Preferably, the mixture (M) is free from polyoxyethylene alkyl-ether-type nonionic or polyoxypropylene alkyl-ether-type nonionic surfactants.

More preferably, the mixture (M) is free from surfactants.

To the purpose of the invention, the term surfactant is intended to denote compounds having at least one oil soluble moiety and at least one water soluble moiety, generally characterized by a "Hydrophile-Liphophile Balance" (HLB) value of 8 to 20.

The composition of the invention comprises advantageously less than 12% wt, preferably less than 10% wt (based on the total weight of the composition) of solvent having a boiling point of 140° C. or more.

The composition of the invention advantageously comprises one or more inorganic filler; the inorganic filler is generally chosen among the followings: inorganic pigments, metal flakes, metal oxides, mica derivatives.

In the rest of the text, the expression "inorganic filler (I)" is understood, for the purposes of the present invention, both in the plural and the singular, that is to say that the inventive composition may comprise one or more than one inorganic filler (I).

The inorganic filler can be mixed with the composition of the invention in an amount within the range in which the effects of the present invention are not lost.

Should the composition comprises an inorganic filler (I), said inorganic filler is present in an amount of advantageously at least 0.01%, preferably at least 0.05%, more preferably at least 0.1% by weight of polymer (F).

Should the composition comprises an inorganic filler (I), said inorganic fillers are added in an amount of advantageously at most 30%, preferably at most 25%, more preferably at most 20% by weight of polymer (F).

As the pigments, various conventionally known pigments can be used; non-limitative examples are titanium oxide, carbon black and colcothar.

Non limitative examples of metal flakes are flakes of titanium, zirconium, aluminium, zinc, antimony, tin, iron and nickel. Of these, in view of difficulty in rusting, titanium and zirconium are preferable.

As the metal oxide, mention can be notably made of oxides of zinc, of magnesium, of calcium.

Preferably the composition of the invention comprises at least one mica derivative.

In the rest of the text, the expression "mica derivative" is intended to denote materials comprising any of various minerals known as mica.

Mica derivatives are particularly useful in the composition of the invention because they advantageously provide coating of outstanding appearance and finishing.

Figure 1:
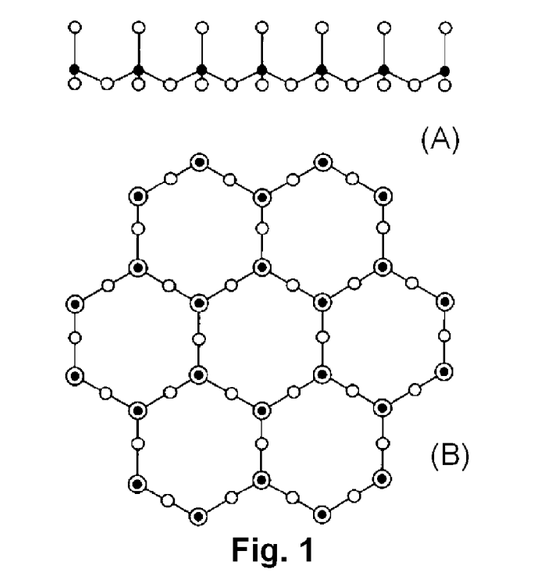
FIG. 1 is an illustration of a tetrahedral $(Si, Al)_4O_{10}$ layer in mica with apical oxygen atoms pointing upward. Open circles indicate oxygen atoms, filled circles indicate silicon (or aluminum) atoms. (A) is a side view; (B) is an up view.
Figure 2:
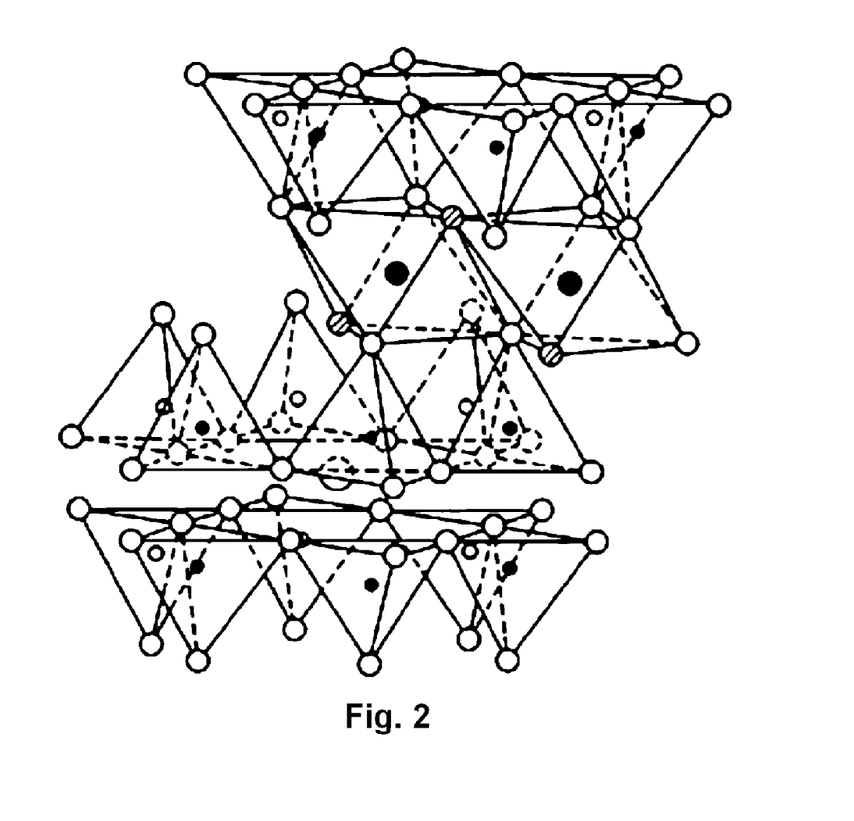
FIG. 2 is an illustration of a three-dimensional structure of mica, wherein ○ is oxygen, ⊘ is a hydroxyl, ● is a X, Y site, ○ is a W site and ○, ● are silicons (optionally replaced by Al).

Micas are notably members of a class of silicates known as phyllo- or sheet silicates, a term which reflects their crystal structure allowing perfect cleavage into very thin leaves. The general chemical formula for mica is $W(X,Y)_{2-3}Z_4O_{10}(OH,F)_2$, where W corresponds to K, Na, and Ca, or more rarely Ba, Rb, and Cs. The X,Y site is occupied by any two ions of Al, Mg, Fe, or Li, and less frequently of Mn, Cr, and Ti. Normally Z is Si or Al, but may also be Fe or Ti. As with other silicates the primary building unit of mica is the $SiO_4$ tetrahedron. The tetrahedra are linked together via their three basal oxygen ions to form a network of hexagonal cells with the apical oxygen ions all pointing in the same direction (FIG. 1). The idealized basic structural unit of mica comprises two layers of tetrahedra in which the apical oxygen ions point toward each other. The voids between the bases of tetrahedra in adjacent layers and between adjacent apical oxygen ions provide the cation sites (FIG. 2). The interapical plane is occupied by the octahedrally coordinated X, Y ions which may be any two of Al, Mg, Fe, or Li. The W sites (filled by K, Na, and less frequently Ca cations) are in 12-fold coordination with the basal oxygen ions. Most commonly these stacking sequences lead to either one- or two-layered monoclinic cells (denoted as 1 M and 2 $M_1$), an alternative two-layered monoclinic cell (2 $M_2$), or a three-layered trigonal unit (3 T).

The important species of the mica group are notably:
muscovite, common or potash mica, pale brown or green, often silvery, including damourite (also called hydromica and muscovy glass);
biotite, iron-magnesia mica, dark brown, green, or black;
lepidolite, lithia mica, rose-red, lilac;
paragonite, a colorless or pale brown mica with sodium
phlogopite, a brown form of mica consisting of hydrous silicate of potassium and magnesium and aluminum
zinnwaldite, a mica containing iron and lithium The mica derivative can be notably a mica particle or a mica particle coated with an inorganic pigment and/or a metal oxide.

Coated mica particles can be obtained by adhering pigment and/or a metal oxide such as $TiO_2$ or $TiO_2.Fe2O_3$ to the mica particles by sintering deposition.

Mica derivative particles have an average particle size of advantageously at least 1, preferably at least 2, more preferably at least 5 μm.

Mica derivative particles have an average particle size of advantageously at most 200, preferably at most 150, more preferably at most 100 μm, even more preferably at most 50 μm.

Preferred mica derivatives are mica particles and mica particles coated with $TiO_2$.

Should the composition comprise a mica derivative, its amount is of advantageously at least 0.01%, preferably of at least 0.05%, more preferably of at least 0.1% by weight of polymer (F).

Should the composition comprise a mica derivative, its amount is of advantageously at most 15%, preferably of at most 10%, more preferably of at most 5% by weight of polymer (F).

According to an embodiment of the invention, the composition further comprises
at least one aromatic polyamic acid [polymer (APA)] comprising recurring units, more than 50% mol of said recurring units comprising at least one aromatic ring and at least one amic acid group and/or imide group [recurring units (R1)], more than 50% mol of recurring units (R1) comprising at least one amic acid group, part or all of the amic acid groups being neutralized by at least one basic compound (B).

Examples of polymers (APA) suitable for this embodiment of the invention are those described in International patent application WO2005/012423.

The recurring units (R1) of the polymer (APA) are advantageously chosen from:

(R1-A)

(R1-B)

(R1-C)

(R1-D)

(R1-E)

wherein:
- the → denotes isomerism so that in any recurring unit within the aromatic polyamic acid structure the groups to which the arrows point may exist as shown or in an interchanged position
- Ar is selected among following structures wherein X= with n=0, 1, 2, 3, 4 or 5;
R is selected among following structures wherein Y= with n=0, 1, 2, 3, 4 or 5.
Recurring units (R1) are preferably chosen from:
(i)

(i-a)

and/or the corresponding imide-group containing recurring unit:

(i-b)

wherein the attachment of the two amide groups to the aromatic ring as shown in (i-a) will be understood to represent the 1,3 and the 1,4 polyamide-amic acid configurations;

(ii)

(ii-a)

and/or the corresponding imide-group containing recurring unit:

(ii-b)

wherein the attachment of the two amide groups to the aromatic ring as shown in (ii-a) will be understood to represent the 1,3 and the 1,4 polyamide-amic acid configurations; and (iii)

(iii-a)

and/or the corresponding imide-group containing recurring unit:

(iii-b)

wherein the attachment of the two amide groups to the aromatic ring as shown in (iii-a) will be understood to represent the 1,3 and the 1,4 polyamide-amic acid configurations.

Recurring units (R1) are more preferably recurring units (i) or mixture of recurring units (ii) and (iii).

Preferably, the polymer (APA) comprises more than 90% mol of recurring units (R1). More preferably, it contains no recurring unit other than recurring units (R1).

Excellent results were obtained with aromatic polyamic acid (A) consisting of recurring units (i) or of a mix of recurring units (ii) and (iii).

The mole percent of recurring units (R1) comprising at least one amic acid group can be calculated as follows (eq. 1):

$$\frac{[(R1-A) \text{ units}]_{mole\ fraction} + 2 \times [(R1-B) \text{ units}]_{mole\ fraction} + [(R1-D) \text{ units}]_{mole\ fraction}}{[(R1-A) \text{ units}]_{mole\ fraction} + [(R1-C) \text{ units}]_{mole\ fraction} + 2 \times [(R1-B) \text{ units}]_{mole\ fraction} + [(R1-D) \text{ units}]_{mole\ fraction} + [(R1-E) \text{ units}]_{mole\ fraction}} \times 100$$

where (R1-A), (R1-B), (R1-C), (R1-D) and (R1-E) denote the recurring units (R1) as above described.

At least preferably 55% mol, more preferably 60% mol of recurring units (R1) comprise at least one amic acid group.

The acid number (milligrams of KOH/gram) of the polymer (APA) is advantageously at least 100, more preferably at least 110 and still more preferably at least 120, and may be up to the theoretical acid number for a resin that comprises only amic acid units.

The number average molecular weight ($M_n$) of the polymer (APA) is advantageously at least 1000, preferably at least 1500, more preferably at least 2000.

The number average molecular weight ($M_n$) of the polymer (APA) is advantageously at most 20000, preferably at most 15000, more preferably at most 10000.

The inherent viscosity of the polymer (APA) is at least 0.1, preferably at least 0.15, more preferably at least 0.2 dl/g when measured as a 0.5% wt solution in N,N-dimethylacetamide at 30° C.

The polymer (APA) can be notably manufactured by a process including the polycondensation reaction between (I) at least one acid monomer chosen from pyromellitic anhydride, bis(3,4-dicarboxyphenyl)ether dianhydride, trimellitic anhydride and trimellitic anhydride monoacid halides and (II) at least one comonomer chosen from diamines and diisocyanates.

Among the pyromellitic anhydride, bis(3,4-dicarboxyphenyl)ether dianhydride, trimellitic anhydride and trimellitic anhydride monoacid halides, trimellitic anhydride monoacid chloride is preferred.

The comonomer comprises preferably at least one aromatic ring. Besides, it comprises preferably at most two aromatic rings. More preferably, the comonomer is a diamine. Still more preferably, the diamine is chosen from the group consisting of 4,4'-diaminodiphenylmethane, 4,4'-diaminodiphenylether, m-phenylenediamine, para-phenylenediamine, 4,4'-diaminodiphenylsulfone, 4,4'-diaminodiphenylsulfide, and mixtures thereof.

The polycondensation reaction is advantageously carried out under substantially anhydrous conditions in a polar solvent and at a temperature below 150° C., employing substantially stoichiometric quantities of the acid monomer and of the comonomer. A slight stoichiometric excess, usually from about 0.5 to about 5 mole %, of either monomer, preferably of the acid monomer, can be employed if desired in order to control molecular weight; alternatively a monofunctional reactant can be employed as an endcapping agent for this purpose, and to improve stability.

The polymer (APA) is advantageously isolated in solid form under mild conditions, preferably by being coagulated or precipitated from the polar reaction solvent by adding a miscible non-solvent, for example water, a lower alkyl alcohol or the like. Optionally, the solid resin may then be collected and thoroughly washed with water, and centrifuged or pressed to further reduce the water content of the solid without applying heat. Non-solvents other than water and lower alkyl alcohols are known and have been used in the art for precipitating polymer (APA) from solution including, for example, ethers, aromatic hydrocarbons, ketones and the like.

The composition according to this embodiment of the invention comprises advantageously at least 0.01% wt, preferably at least 0.05% wt, more preferably at least 0.1% wt of polymer (APA) with respect to the total weight of the composition.

The composition according to this embodiment comprises advantageously at most 50% wt, preferably at most 25% wt, more preferably at most 15% wt of polymer (APA) with respect to the total weight of the composition.

To neutralize part or all of the amic acid groups of the aromatic polyamic acid (APA), the polymer (APA) is advantageously reacted with a basic compound suitable for neutralizing carboxylic groups of R1 recurring units in aqueous medium.

Suitable basic compounds (B) are notably all those can neutralize the amic groups of the recurring units R1 of the polymer (APA).

Inorganic and organic bases can be used for neutralizing part or all of the amic acid groups of the polymer (APA).

Non limitative examples of inorganic bases are notably alkaline and alkaline-earth metal hydroxides, such as NaOH, KOH, $Mg(OH)_2$, ammonia and the like.

Non limitative examples of organic bases are notably organic amines, such as aliphatic, aromatic, heterocyclic or heteroaromatic amines.

Preferably the basic compound (B) is a tertiary amine. The tertiary amine may be notably a tri-($C_1$-$C_4$ alkyl)amine such as, for example, trimethylamine, N,N-dimethylethylamine, N,N-dimethylpropylamine, triethylamine, tributylamine or the like. Cyclic tertiary amines may also be found useful, as may any of the variety of well known, water-miscible, tertiary alkanol amines including N,N-dimethylethanolamine, diethyl-2-hydroxyethylamine and the like. Aromatic amines, such as N,N-dimethylaniline, pyridine, N-methylpyrrole can also be employed. Although polyfunctional amines such as N,N'-dimethylpiperidine, as well as N,N,N'N'-tetraalkyl-alkaline diamines and poly-N-alkylated alkalene triamines may also be found effective, the polyfunctional amines may tend to form associative crosslinks and gel, and will be less preferred.

Most preferred basic compound (B) is chosen from the group consisting of triethyl amine and N,N-dimethylethanolamine and mixture thereof.

Tertiary amines are notably known to increase the rate of thermal imidization and curing for aromatic polyamic acids, and may be effective in promoting rapid curing of aromatic polyamic acid films and coatings.

The minimum amount of basic compound (B) employed will be approximately the stoichiometric amount required to neutralize the amic acid groups in the polymer (APA), and preferably will be at least 0.8, more preferably at least 0.9 mole for each mole of amic acid groups in the polymer (APA).

The maximum amount of basic compound employed will be advantageously at most 5 moles, preferably at most 4.5 moles, more preferably at most 4.0 moles for each mole of amic acid groups in the polymer (APA).

The composition of the invention can further comprise one of more additive such as antioxidant agents, anti-UV agents, thermal stabilizers, acid-scavenger; generally each of these components, if present, is comprised in amounts between 0.1% and 5% by weight of polymer (F).

Another aspect of the present invention concerns a process for manufacturing the composition as above described.

Preparation of the composition of the present invention can be conducted by the usual method, well known to those skilled in the art.

Advantageously, the process comprises mixing the polymer (F), the solvent mixture (M), water and optionally other ingredients, such as inorganic filler (I).

The polymer (F) can be used in the process of the invention either as dry powder or as water dispersion.

For example, in an aqueous dispersion of particles of polymer (F), the solvents mixture (M) and, if necessary, inorganic filler (I) and other additives are added and mixed by stirring at a temperature from 5 to 30° C. The solid content concentration can be controlled by adding water.

Should the polymer (F) be produced by emulsion polymerization, it is advantageously used in the process of the invention as water dispersion. Suitable water dispersion can be obtained from lattices produced during polymerization via standard techniques, including for instance concentration, purification and the like.

Preferably the polymer (F) is used as dry powder.

Should the polymer (F) be used as dry powder, it is advantageously mixed with an aqueous medium comprising the solvent mixture (M) in an amount of more than 10% wt (based on the total weight of the aqueous medium), to yield a blend. After homogeneization of said blend, the required amount of water for obtaining the target polymer (F) and solvent mixture (M) concentration is added. Following this procedure, wettability of the polymer (F) powder is improved and a better dispersion of polymer (F) particles in the composition can be obtained.

Another object of the invention is the use of the composition of the invention for coatings.

As the coating method, various conventional coating methods may be employed. Examples are dipping method, spray method, roll coat method, doctor blade method and flow coat method.

The composition of the present invention can be applied directly to the substrate, thanks to its outstanding adhesion properties; nevertheless, the composition of the invention can be applied on a previously formed primer layer so as to obtain a top coat layer without exiting the scope of the invention.

The substrate is not particularly limited but various metals, porcelain enamel, glass and various ceramics can be employed.

Preferred are metal substrates. The metal component can comprise brass, aluminum, bronze, stainless steel and carbon steel, preferably carbon steel.

In order to improve adhesion, the surface of the substrate is preferably roughened by sand blasting before coating.

The composition of the invention which is applied to the substrate is then generally dried. The composition of the present invention is advantageously characterized in that mud crack does not occur at this step of drying.

Drying is conducted under the usual conditions and although depending on the boiling point of the solvents mixture (M) which is used, when conducted at room temperature to 150° C., more preferably 80 to 150° C., notably for 5 to 20 minutes, set to touch is achieved, so as to obtain a dried coating film.

Then, the dried coating film is generally baked (processed). The baking (processing) temperature and time differ according to the kind and melting point of the polymer (F); baking is typically conducted at the melting point of polymer (F) or higher, usually between 2000 to 400° C., for 5 to 30 minutes. In the case of ECTFE, baking at 2000 to 300° C., preferably from 200 to 270° C. for 10 to 30 minutes is suitable.

When several layers are to be coated or when a primer layer is provided, the method of applying, drying and baking the first layer comprising the composition of the invention or the primer layer and then applying, drying and baking the second layer of the composition of the present invention or the method of applying and drying the first or primer layer, applying and drying the second layer of composition of the present invention and then simultaneously baking both layers may be employed.

By using the composition of the present invention, a thick coating film having a thickness of the melted coating film of at least 30 μm can be obtained by a single coating. The upper limit is not particularly limited but when the coating film is too thick, various kinds of decomposed residue remain in the coating film, which becomes a cause of coloring, so that typically the limit is at most 1500 μm.

The composition of the present invention is most useful for coating substrates, generally metal substrates, which require corrosion resistance. Examples of such substrates are bearings, valve, electric wires, metal foils, boilers, pipes, ship bottoms, oven linings, bottom plates of irons, bread pans, rice cookers, grill pans, electric pots, ice making trays, snow plow shovels, spades, chutes, conveyers, rolls, metal dies, dies, saws, files, tools such as a drill, kitchen knives, scissors, hoppers, other industrial containers (particularly for the semiconductor industry) and casting molds.

The present invention also relates to the coated articles, obtained using the composition of the invention as above described.

The present invention will be now described in more details by reference to the following examples, whose purpose are merely illustrative and do not limit the scope of the present invention.

EXAMPLES

Melt Index (MFI)

The melt index (MFI) of the fluorinated polymers is measured according to the ASTM standard n° D1238, under a piston load of 2.16 kg.

Second Melting Temperature ($T_{m2}$)

The $T_{m2}$ of the polymer (F) is determined by differential scanning calorimetry (DSC), according to ASTM D 3418.

Peeling Force and Substrate Adhesion

Pass/fail criteria for adhesion between first layer of polymer (F) and metal substrate have been set as follows.

The necessary force (N/mm) to separate the coating from the substrate is measured by a dynamometer.

Adhesion is considered unsatisfactory (fail) if detachment of the polymer (F) layer occurs at a peeling force of less than 4 N/mm. Adhesion is considered satisfactory (pass) if no delamination occurs or if delamination occurs at a peeling force of 4 N/mm or more.

Inter Layers Adhesion

Pass/fail criteria for inter layers adhesion between layers of polymer (F) obtained from the composition of the invention are visually verified. Adhesion is considered unsatisfactory (fail) if detachment of the upper layer during baking is observed. Adhesion is considered satisfactory (pass) if a consistent multilayer coating is obtained with no blistering no detachment.

Preparation of Solvents Mixtures (M)

Two solvents mixtures (M) were prepared, namely comparative mixture $M_{comp}$ and mixture $M_1$ according to the invention; their composition is summarized in table 1, in which weight parts of each component are reported.

TABLE 1

| solvent mixture | Boiling point | $M_{comp}$ | $M_1$ |
|---|---|---|---|
| Isopropanol (IPA) | 82° C. | 100 | 30 |
| Propylene glycol n-propyl ether DOWANOL ® PnP | 149° C. | | 20 |
| Ethyleneglycol | 197° C. | | 20 |
| Tripropylene glycol methyl ether DOWANOL ® TPM | 245° C. | | 30 |

Comparative Example 1

95 g of ECTFE copolymer (50% mol ethylene; 50% mol chlorotrifluoroethylene), having a MFI of about 1 g/10 and a $T_{m2}$ of 242° C., having a particle size between 25 and 35 μm and an heat of fusion of about 40 J/g, and also comprising 3% wt of IRIODIN® 123 mica powder coated with titanium dioxide, commercially available from MERCK and having a particle size between 5 and 25 μm as inorganic filler were blended with 95 g of water and 10 g of solvent $M_{comp}$. After homogenization for 10 minutes on a roll bar system, the so-obtained water-based composition was sprayed using a spray gun having a 1.2 mm die with a compressed air pressure of 1 to 1.5 bar on a carbon steel plate of 100 mm×100 mm with a thickness of 3 mm kept in vertical position. The plate was previously sand blasted at 60 mesh, pretreated in oven at 400° C. for 30 min and finally cooled to room temperature.

After deposition of the polymer layer, the plate was treated in the oven following the following thermal cycle profile (drying/baking cycle):

From 200 to 90° C. in 10 min
Dwell at 90° C. for 10 min
From 90 to 110° C. in 10 min
Dwell at 110 for 10 min
From 110° to 200° C. in 10 min
Dwell at 200° C. for 10 min
From 200 to 250° C. in 10 min Dwell at 250 for 10 min
From 250 to 265° C. in 10 min
Dwell at 265 for 20 min.

The plate was then cooled at room temperature, and then sprayed again with the same composition and thermal treated according to cycle above described.

Example 2

The procedure described in example 1 has been repeated but using solvent mixture $M_1$ instead of solvent $M_{comp}$.

Example 3

The procedure described in example 1 has been repeated but using a composition comprising solvents mixture $M_1$ instead of solvent mixture $M_{comp}$ for coating the second layer.

Table 2 here below summarizes the results of the determinations carried out on the so-obtained coated metal plates.

TABLE 2

| Example | Layer | Solvent mixture % wt | Solvent mix | Substrate adhesion | Inter layers adhesion |
|---|---|---|---|---|---|
| 1 (comparative) | $1^{st}$ | 5 | $M_{comp}$ | PASS | n.a.[1] |
|  | $2^{nd}$ | 5 | $M_{comp}$ | n.a.[1] | FAIL |
| 2 | $1^{st}$ | 5 | $M_1$ | PASS | n.a.[1] |
|  | $2^{nd}$ | 5 | $M_1$ | n.a.[1] | PASS |
| 3 | $1^{st}$ | 5 | $M_{comp}$ | PASS | n.a.[1] |
|  | $2^{nd}$ | 5 | $M_1$ | n.a.[1] | PASS |

[1]n.a. = not applicable

The invention claimed is:

1. A fluoropolymer composition consisting of:
   at least one thermoplastic partially fluorinated fluoropolymer, polymer (F);
   water; and
   a water-soluble solvent mixture, mixture (M), comprising:
   at least one alcohol solvent, solvent (A), said alcohol solvent being an organic solvent comprising at least one hydroxyl group and being free from functional groups other than said hydroxyl group; and
   at least one glycol derivative solvent having a boiling point of at least 100° C., solvent (GD), wherein the solvent (GD) is selected from the group consisting of:
   propylene glycol derivatives, dipropylene glycol derivatives, and tripropylene glycol derivatives and
   wherein mixture (M) is present in an amount less than 15% wt., based on the total weight of the fluoropolymer composition, said mixture (M) being free from surfactants and optionally an inorganic filler and other additives being free from surfactants.

2. The composition according to claim 1, wherein the polymer (F) is selected from the group consisting of:
   (F-1) vinylidene fluoride (VdF) polymers, optionally comprising between 0.1 and 15% by moles of one or more fluorinated comonomer(s), and optionally further comprising one or more fluorinated or hydrogenated comonomer(s), and
   (F-2) tetrafluoroethylene (TFE) and/or chlorotrifluoroethylene (CTFE) copolymers with ethylene, propylene or isobutylene, with a molar ratio of per(halo)fluoromonomer(s)/hydrogenated comonomer(s) of from 30:70 to 70:30, optionally containing one or more comonomers in amounts of from 0.1 to 30% by moles, based on the total amount of TFE and/or CTFE and hydrogenated comonomer(s).

3. The composition according to claim 2, wherein the polymer (F) is a CTFE or TFE copolymer (F-2) comprising:
   (a) from 35 to 65% by moles of ethylene (E);
   (b) from 65 to 35% by moles of chlorotrifluoroethylene (CTFE), for ethylene/chlorotrifluoroethylene (ECTFE) copolymers, and/or tetrafluoroethylene (TFE), for ethylene/tetrafluoroethylene ETFE copolymers; and optionally
   (c) from 0.1 to 30%, by moles, based on the total amount of monomers (a) and (b), of one or more fluorinated comonomer(s) (c1) and/or hydrogenated comonomer(s) (c2).

4. The composition according to claim 3, wherein the polymer (F) is an ECTFE copolymer.

5. The composition according to claim 4, wherein the ECTFE copolymer comprises a comonomer (c1) or (c2) selected from the group consisting of 3,3,3-trifluoro-2-trifluoromethylpropene (HFIB), perfluoropropylvinylether (PPVE), 2,2,4-trifluoro-5-trifluoromethoxy-1,3-dioxole (TTD), n-butylacrylate and mixtures thereof.

6. The composition of claim 3, wherein the polymer (F) is a CTFE or TFE copolymer (F-2) comprising 45 to 55% by moles of ethylene.

7. The composition of claim 3, wherein the polymer (F) is a CTFE or TFE copolymer comprising 48 to 52% by moles of ethylene.

8. The composition of claim 3 wherein the polymer (F) is a CTFE or TFE copolymer comprising 45 to 55% by moles of chlorotrifluoroethylene, for ethylene/chlorotrifluoroethylene copolymers, and/or tetrafluoroethylene, for ethylene/tetrafluoroethylene copolymers.

9. The composition of claim 3, wherein the polymer (F) is a CTFE or TFE copolymer comprising 48 to 52% by moles of chlorotrifluoroethylene, for ethylene/chlorotrifluoroethylene copolymers, and/or tetrafluoroethylene, for ethylene/tetrafluoroethylene copolymers.

10. The composition of claim 3, wherein the polymer (F) is a CTFE or TFE copolymer comprising 0.1 to 10% by moles, based on the total amount of monomers (a) and (b), of one or more fluorinated comonomer(s) (c1) and/or hydrogenated comonomer(s) (c2).

11. The composition of claim 3, wherein the polymer (F) is a CTFE or TFE copolymer comprising 0.1 to 5% by moles, based on the total amount of monomers (a) and (b), of one or more fluorinated comonomer(s) (c1) and/or hydrogenated comonomer(s) (c2).

12. The composition according to claim 2, wherein the polymer (F) is a tetrafluoroethylene (TFE) and/or chlorotrifluoroethylene (CTFE) copolymer with ethylene.

13. The composition according to claim 1, wherein the solvent mixture (M) comprises solvent (A) and solvent (GD) in a weight ratio of 20/80 to 80/20.

14. The composition according to claim 1, further consisting of at least one mica derivative.

15. A process for manufacturing the composition according to claim 1, comprising mixing together polymer (F), water, and mixture (M) and optionally an inorganic filler and other additives.

16. The process of claim 15, wherein an aqueous dispersion of polymer (F), the mixture (M) and, if necessary, an inorganic filler and other additives are added and mixed at a temperature of 5 to 30° C.

17. The process of claim 15, comprising:
   mixing a dry powder of polymer (F) with an aqueous medium comprising mixture (M) in an amount greater than 10% wt., based on the total weight of the aqueous medium, to yield a blend, homogenizing the blend, and
adding water.

18. A method for coating articles, comprising coating articles with the composition according to claim 1.

19. Coated articles comprising the composition according to claim 1.

20. The composition of claim 1, wherein the solvent (GD) is selected from the group consisting of: propylene glycol methyl ether ($CH_3OCH_2CH(CH_3)OH$), propylene glycol methyl ether acetate ($CH_3OCH_2CH(CH_3)OC(O)CH_3$), propylene glycol n-butyl ether ($n\text{-}C_4H_9OCH_2CH(CH_3)OH$), propylene glycol n-propyl ether ($n\text{-}C_3H_7OCH_2CH(CH_3)OH$), dipropylene glycol methyl ether ($CH_3O(CH_2CH(CH_3)O)_2H$), dipropylene glycol methyl ether acetate ($CH_3O[CH_2CH(CH_3)O]_2C(O)CH_3$), dipropylene glycol n-butyl ether ($n\text{-}C_4H_9O(CH_2CH(CH_3)O)_2H$), dipropylene glycol n-propyl ether ($n\text{-}C_3H_7O(CH_2CH(CH_3)O)_2H$), dipropylene glycol dimethyl ether ($CH_3O(CH_2CH(CH_3)O)\mathbf{2}CH_3$), tripropylene glycol methyl ether ($CH_3O(CH_2CH(CH_3)O)_3H$), and tripropylene glycol n-butyl ether ($n\text{-}C_4H_9O(CH_2CH(CH_3)O)_3H$).

* * * * *